United States Patent
Certain et al.

(10) Patent No.: US 9,415,881 B2
(45) Date of Patent: Aug. 16, 2016

(54) ROTORCRAFT HAVING AN AIRSPEED SENSOR LOCATED AT THE TOP OF A TAIL FIN OF THE ROTORCRAFT

(71) Applicant: AIRBUS HELICOPTERS, Marignane (FR)

(72) Inventors: Nicolas Certain, Aix en Provence (FR); Olivier Delecroix, Eguilles (FR)

(73) Assignee: Airbus Helicopters, Marignane Cedex (FR)

( * ) Notice: Subject to any disclaimer, the term of this patent is extended or adjusted under 35 U.S.C. 154(b) by 0 days.

(21) Appl. No.: 14/708,775

(22) Filed: May 11, 2015

(65) Prior Publication Data

US 2015/0360794 A1 Dec. 17, 2015

(30) Foreign Application Priority Data

May 12, 2014 (FR) .................................... 14 01064

(51) Int. Cl.
- *B64D 43/02* (2006.01)
- *G01P 5/26* (2006.01)
- *G01P 5/00* (2006.01)
- *G01P 13/02* (2006.01)

(52) U.S. Cl.
CPC . *B64D 43/02* (2013.01); *G01P 5/00* (2013.01); *G01P 5/26* (2013.01); *G01P 13/025* (2013.01)

(58) Field of Classification Search
CPC ............. B64D 43/02; G01P 5/26; G01P 5/00; G01P 13/025
USPC ....................... 701/7, 10, 14; 244/17.13, 76 R
See application file for complete search history.

(56) References Cited

U.S. PATENT DOCUMENTS

| | | | |
|---|---|---|---|
| 4,031,756 A | 6/1977 | Rotier et al. | |
| 4,590,475 A * | 5/1986 | Brown | G05D 1/0607 244/76 R |
| 4,648,269 A | 3/1987 | Durand | |
| 5,063,777 A | 11/1991 | Arethens et al. | |
| 2006/0027702 A1 | 2/2006 | Rouse et al. | |
| 2013/0221153 A1* | 8/2013 | Worsham, II | B64C 27/006 244/17.13 |

FOREIGN PATENT DOCUMENTS

| | | |
|---|---|---|
| EP | 1462806 | 9/2004 |
| FR | 2567270 | 1/1986 |
| FR | 2648233 | 12/1990 |
| WO | 0174663 | 10/2001 |

OTHER PUBLICATIONS

French Search Report for FR 1401064, Completed by the French Patent Office on Jan. 8, 2015, 7 Pages.

* cited by examiner

*Primary Examiner* — Tan Q Nguyen (74) *Attorney, Agent, or Firm* — Brooks Kushman P.C.

(57) ABSTRACT

A method of calculating and displaying the true airspeed of a rotorcraft. At least one omnidirectional airspeed sensor is installed at the top of a tail fin of the rotorcraft. The true airspeed of the rotorcraft flying at speeds that are lower than or equal to at least one airspeed threshold of the rotorcraft is calculated by correcting the measurements supplied by the airspeed sensor installed at the top of the tail fin as a function of the effects produced by the air stream generated by rotation of the main rotor of the rotorcraft on the characteristics of the speed of the air stream measured by the tail fin airspeed sensor. For this purpose, a correction rule calibrated in test flight is advantageously applied to correct the measurements supplied by the airspeed sensor installed at the top of the tail fin.

22 Claims, 1 Drawing Sheet

ROTORCRAFT HAVING AN AIRSPEED SENSOR LOCATED AT THE TOP OF A TAIL FIN OF THE ROTORCRAFT

CROSS REFERENCE TO RELATED APPLICATION

This application claims priority to French patent application No. FR 14 01064 filed on May 12, 2014, the disclosure of which is incorporated in its entirety by reference herein.

BACKGROUND OF THE INVENTION (1) Field of the Invention

The present invention relates to the field of airspeed indicator installations for rotorcraft.

Aircraft are conventionally provided with an airspeed indicator installation that supplies the pilot with information about the airspeed of the aircraft, i.e. the speed at which said aircraft is moving relative to the air in which it is flying. Such an installation conventionally makes use of at least one airspeed sensor measuring the characteristics of the speed of the air stream surrounding the aircraft, and more particularly its speed vector components extending respectively substantially along at least the longitudinal axis and/or the transverse axis of the aircraft.

(2) Description of Related Art

In this context, the airspeed indicator installation provides the pilot of the rotorcraft, in particular by means of a display, with the speed of the aircraft relative to said surrounding air stream, referred to as the airspeed, on the basis of measurements supplied by the airspeed sensor and defined in terms at least of a longitudinal airspeed component, and possibly also of a lateral airspeed component.

The ground speed of the aircraft is conventionally supplied by an on-board instrument of the aircraft, typically such as a satellite location appliance, for example. Under such conditions, knowledge of the airspeed of the aircraft makes it possible to identify the characteristics of the wind to which the aircraft is subjected.

The airspeed sensors that are conventionally used in aviation commonly make use of at least one Pitot tube. Such airspeed sensors enable the airspeed of the aircraft to be deduced from measurements supplied by the Pitot tube(s) for the static air pressure and for the total air pressure of the air surrounding the airspeed sensor.

Nevertheless, the main source of error in an airspeed sensor lies in it being impossible for the airspeed sensor to be continuously in alignment with the air stream surrounding the aircraft. Certain airspeed sensors cannot align themselves with this air stream.

In this context, omnidirectional airspeed sensors have been developed that provide airspeed measurements defined using vector components, and in particular at least a longitudinal component and a lateral component.

Conventionally, the vector components of the airspeed as measured by an omnidirectional airspeed sensor are identified along the general axes in which the aircraft in question extends when on the ground. The longitudinal component of the airspeed is commonly defined along the longitudinally extending axis of the aircraft that extends between the front and the rear of the aircraft. The lateral component of the airspeed is commonly defined along the transversely extending axis of the aircraft that extends between the right and left sides of the aircraft.

In aviation, use is made more particularly of omnidirectional airspeed sensors of the low range airspeed system (LORAS) type. LORAS type airspeed sensors make use of a pair of Pitot tubes that are rotatably mounted and arranged in opposite directions so that such LORAS airspeed sensors can measure the longitudinal component and the lateral component of the airspeed.

To measure the airspeed of an aircraft, it is also known to make use of remote-detection omnidirectional airspeed sensors that make use of light rays of the laser beam type or of soundwaves of the ultrasound type.

By way of example, optical airspeed sensors, such as light detection and ranging (LIDAR) airspeed sensors enable the airspeed of an aircraft to be measured by sequentially transmitting and receiving a laser light beam at a given repetition rate.

Also by way of example, ultrasound airspeed sensors, such as the airspeed sensor described in Document U.S. Pat. No. 4,031,756 (Honeywell) for example, makes it possible to measure the airspeed of an aircraft by transmitting and receiving ultrasound waves.

In this technological context relating to airspeed indicator installations for aircraft, it is necessary among powered aircraft to take into consideration the features that are specific to rotorcraft.

Rotorcraft are aircraft with one or more rotary wings in which at least lift is provided by at least one main rotor having a rotary drive axis that is substantially vertical. In the specific context of a helicopter, the main rotor provides the rotorcraft not only with lift, but also with propulsion in any travel direction.

Aircraft are also commonly fitted with at least one auxiliary rotor having a rotary drive axis that is substantially horizontal. Such an auxiliary rotor constitutes in particular an anti-torque device serving to stabilize and guide the rotorcraft in yaw. By way of example, such an auxiliary rotor is a tail rotor installed at the end of a tail boom of the rotorcraft, and sometimes surrounded by a fairing that, among other advantages, serves to reduce the sound nuisance generated by the tail rotor.

Rotorcraft are also commonly provided with stabilizers serving to stabilize the flight attitude of the rotorcraft, or indeed to modify it.

By way of example, such stabilizers may be formed by wings extending generally in a substantially horizontal plane of the rotorcraft as defined by the longitudinal and transverse axes of the rotorcraft, considered when standing on the ground. Such stabilizers may also be formed by fins that extend generally in a substantially vertical plane of the rotorcraft, considered when standing on the ground, said vertical plane being oriented perpendicularly to said horizontal plane.

Such fins are conventionally placed at the rear of the rotorcraft, in particular at the end of a tail boom, and they are commonly inclined relative to the vertical plane of the rotorcraft.

Compared with other aircraft, measuring the airspeed of a rotorcraft raises specific problems that result in particular from the presence of rotors that, by rotating, disturb the air stream around the rotorcraft. In this context, there arises the problem of where to place the airspeed sensor on board on the rotorcraft in order to obtain the most pertinent possible information about the airspeed of the rotorcraft.

Specifically, a rotor produces a wake as a result of its own rotation. This means that the pertinence of the measurements supplied by the airspeed sensors in order to obtain information about the airspeed of the rotorcraft depends on locating the airspeed sensor on the rotorcraft while protecting it as well as possible from the aerodynamic effects generated by the rotor(s).

Under such conditions, and in particular concerning Pitot tube airspeed sensors, the location for the airspeed sensor on board a rotorcraft may for example be selected to be above the main rotor and on its rotary drive axis, as described in Document US 2006/0027702, or indeed at the front of the rotorcraft, as described in particular in Documents WO 01/74663 and EP 1 462 806.

Concerning remote-detection airspeed sensors, their locations on board a rotorcraft are conventionally selected to be at the front of the rotorcraft and more specifically in the nose of the rotorcraft, with the airspeed sensor facing in the forward travel direction of the rotorcraft.

There is also the problem of measuring the airspeed of a rotorcraft over the entire flight envelope of the rotorcraft.

Compared with other powered aircraft, rotorcraft present the particular feature of being capable of hovering and/or of flying at low speeds, which are typically considered as being speeds lower than 50 knots (kt). Nevertheless, at speeds lower than 50 kt, simple Pitot tube airspeed sensors, regardless of how high their performance might be, do not enable reliable measurements to be obtained of the airspeed of the aircraft. Specifically, the accuracy of a Pitot tube decreases with decreasing airspeed.

It is common practice to warn the pilot that information about the airspeed of a rotorcraft is not available while flying at low speeds. More particularly, while the rotorcraft is flying at speeds that are higher than low speeds, the airspeed of the rotorcraft is calculated on the basis of measurements provided by the airspeed sensor and it is communicated to the pilot by means of a display. At low travel speeds of the rotorcraft, it is then common practice to display information to the effect that the airspeed of the rotorcraft is not available.

That is why there is a continuous search in the field of rotorcraft to provide a pilot with information that is as reliable as possible about the airspeed of a rotorcraft flying at low speeds and/or while hovering. For this purpose, calculation systems have been developed that enable the airspeed of a rotorcraft to be determined from the flight commands issued by the pilot.

For example, the airspeed of the rotorcraft may be deduced by taking account of the overall flying attitude of the rotorcraft as identified by the current status of its flight mechanism, e.g. by detecting variation in the pitch of the blades of the rotor(s), and in particular of the main rotor. By way of example, reference may be made on this topic to the following Documents: FR 2 567 270 (Durand) and FR 2 648 233 (Crouzet).

Nevertheless, such calculation systems are complex and expensive. Since the measurements supplied by simple Pitot tube airspeed sensors are reliable at high travel speeds of the rotorcraft, it is found in practice that, while the rotorcraft is flying at low speed, a simple Pitot tube airspeed sensor continues to be used for measuring the airspeed of a rotorcraft to the detriment of obtaining airspeed information, with this applying in particular for rotorcraft that are commonly referred to as being "light", and that need in particular to be as inexpensive as possible.

It consequently appears appropriate to continue the search seeking to obtain the most reliable possible measurement of the airspeed of a rotorcraft flying at low speeds by means of an airspeed sensor.

For this purpose, the conventional approach of designers is to improve and/or design airspeed sensors that are suitable for providing the pilot with a measurement of the airspeed of a rotorcraft when it is flying at speeds that are particularly low. In order to obtain measurements that are as reliable as possible at low flying speeds of a rotorcraft, airspeed sensors are conventionally adjusted as from their initial design so as to operate in given measurement ranges.

BRIEF SUMMARY OF THE INVENTION

In this context, the present invention seeks to propose a solution that makes it possible to use an omnidirectional airspeed sensor, which may equally well be of the rotary Pitot tube type or of the remote detection type, for the purpose of measuring the airspeed of a rotorcraft, including when the rotorcraft is flying at speeds lower than 50 kt.

The method of the present invention is a method of calculating and displaying the true airspeed of a rotorcraft. The rotorcraft includes in particular at least one tail fin together with rotors comprising at least a main rotor conventionally providing the rotorcraft at least essentially with its main lift and a tail rotor conventionally providing the rotorcraft at least with guidance in yaw.

The method of the present invention comprises an operation of calculating the true airspeed of the rotorcraft on the basis of measurements supplied by at least one omnidirectional airspeed sensor. After said calculation operation, the method also includes an operation of displaying on a screen the true airspeed of the rotorcraft as deduced by said calculation operation.

In conventional manner, the omnidirectional airspeed sensor provides measurements of the speed of a surrounding air stream. On the basis of the measurements supplied by the omnidirectional airspeed sensor, the calculation means identify the respective amplitudes of vector components characterizing the speed of the air stream measured by the omnidirectional airspeed sensor, including at least a longitudinal component and a lateral component.

Naturally, the respective orientations (such as longitudinal and lateral) of the vector components of the speed of the air stream measured by the airspeed sensor, and also the respective orientations of the calculated airspeed of the rotorcraft are identified and determined relative to the typical orientations in which the rotorcraft extends (such as respectively its longitudinal and transverse orientations). Concerning the typical orientations in which a rotorcraft extends, it should be recalled that the concepts of "horizontal", "vertical", and "transverse", are relative concepts conventionally taken into consideration relative to the position of the rotorcraft in question when standing on the ground.

Typically, the longitudinally extending direction of a rotorcraft is identified along an axis X extending between the front and the rear of the rotorcraft, the vertically extending direction of the rotorcraft is identified along an axis Z extending between the top and the bottom of the rotorcraft, and the transversely extending direction of the rotorcraft is identified along an axis Y extending between the sides of the rotorcraft, with the axes X, Y, and Z defining a rectangular reference frame identifying the travel axes of the rotorcraft.

In a general definition of the method of the present invention, the operation of calculating the true airspeed (TAS) of the rotorcraft is remarkable in that it is performed on the basis of measurements supplied by at least one omnidirectional airspeed sensor installed at the top of the tail fin of the rotorcraft. Such an omnidirectional airspeed sensor is thus referred to as the tail fin airspeed sensor.

It has been found that such an unusual approach makes it possible to obtain a measurement of the true airspeed of the rotorcraft that is reliable and pertinent, in particular when the rotorcraft is hovering or flying at low speeds, or indeed while it is flying at transitional speeds, in particular during stages of takeoff and landing, with this more particularly including situations in which the rotorcraft is flying close to the ground and in which the wash produced by the main rotor disturbs the air surrounding the rotorcraft quite considerably.

When close to the ground, the wash from the main rotor conventionally gives rise to large amounts of aerodynamic disturbance to the air, commonly referred to as the "ground effect". It has been found the protection afforded to the tail fin airspeed sensor as a result of being located at the top of the tail fin makes it possible to identify the airspeed of the rotorcraft in a manner that is reliable and pertinent, providing the measurements supplied by the tail fin airspeed sensor are corrected as a function of the effects produced by the air stream generated by the rotation of the main rotor.

Such protection of the tail fin airspeed sensor can also easily be enhanced by means of a shield placed at the base of the tail fin airspeed sensor, being interposed between the tail fin and the tail fin airspeed sensor. Such a shield advantageously constitutes an obstacle to air flowing along the tail fin towards the tail fin airspeed sensor.

Thus, tail fin airspeed sensors such as remote-detection omnidirectional airspeed sensors making use of light rays of the laser beam type can advantageously be used to measure the airspeed of the aircraft. Such tail fin airspeed sensors make it possible in particular to avoid any particular calibration due to the proximity of the rotors.

Furthermore, it has also been found that the measurements supplied by the tail fin airspeed sensor can be corrected easily by applying affine functions of simple structure that are calibrated in test flights.

In practice, the true airspeed of the rotorcraft flying at speeds lower than or equal to at least one predefined air feed threshold may be calculated by correcting the measurements supplied by the tail fin airspeed sensor as a function of effects produced by the stream of air generated by the rotation of the main rotor on the characteristics of the speed of the air stream measured by the tail fin airspeed sensor.

In the context of the intended objects of the present invention it should naturally be understood that said at least one airspeed threshold is identified at least in association with the rotorcraft hovering and/or flying at low speeds, or indeed with the rotorcraft flying at transitional speeds between low speeds and the high travel speeds of the rotorcraft in cruising flight.

It should be recalled that said low speeds are commonly identified as being lower than 40 kt or lower than 50 kt, and that said transitional airspeeds are commonly considered as lying in the range 50 kt to 60 kt or at least 75 kt depending on the propulsion characteristics of the rotorcraft.

The travel speed of the rotorcraft may be identified by an on-board instrument commonly found on rotorcraft, such as for example a satellite locating appliance commonly referred to as a global positioning system (GPS).

In order to identify the travel speed of the rotorcraft, it is nevertheless preferred to make use of the measurements supplied by the tail fin airspeed sensor, that are set by design to match a range of airspeeds lower than high airspeeds, the tail fin airspeed sensor being suitable for identifying an airspeed of the rotorcraft lower than said at least one airspeed threshold.

As explained below, the rotorcraft may potentially be provided with an auxiliary airspeed sensor. In order to identify the travel speed of the rotorcraft, the measurements supplied by the auxiliary airspeed sensor may also be used to identify an airspeed of the rotorcraft lower than said at least one said airspeed threshold.

Nevertheless, as explained below, the auxiliary airspeed sensor is preferably adjusted on design to operate over a range of operating airspeeds higher than said at least one airspeed threshold, and in particular to operate over a range at high airspeeds.

Furthermore, the effects produced by the air stream generated by the rotation of the main rotor on the air stream having its speed measured by the tail fin airspeed sensor may be identified easily by using a procedure for taking account of the power consumed by the main rotor when applying a correction rule to the measurements supplied by the tail fin airspeed sensor.

As is known in the field of rotorcraft, the mechanical power consumed by the main rotor may for example be evaluated on the basis of the current collective pitch applied to the blades of the main rotor and identified in particular by the flight commands issued by the pilot of the rotorcraft, which pilot may equally well be a human pilot or an autopilot.

Also by way of example, the mechanical power consumed by the main rotor may be evaluated as the product of the speed of rotation of the main rotor multiplied by the torque that the main rotor opposes to being driven in rotation by a power plant of the rotorcraft, or more simply it may even be evaluated on the basis of said torque, providing the main rotor is rotating at constant speed.

Said correction rules may also be structured in the form of functions including affine functions that are preferably applied in succession, with the values of the correction parameters incorporated in said functions being calibrated in test flights.

Such affine functions are conventionally identified in particular by calculation parameters including at least one weighting coefficient and at least one predefined summing value (zero, positive, or negative).

More specifically, it has been found that such functions incorporated in the correction rule are suitable, on the basis of the measurements supplied by the tail fin airspeed sensor, for identifying and for correcting respectively a longitudinal component and a lateral component of the speed of the air stream measured by the tail fin airspeed sensor.

In this context, a summing value may be applied in order to take account of the mechanical power consumed by the main rotor.

The correction rule may be calibrated in test flight when there is no wind, for example. The measurements provided by the tail fin airspeed sensor during the test flight are compared with the travel speed of the rotorcraft as identified by said on-board instruments. It should naturally be understood that other known techniques for calibrating an appliance on board a rotorcraft during a test flight could be used, such as in the presence of wind of characteristics that have been identified by a weather station on the ground.

On the basis of such a comparison, the respective values for the correction parameters incorporated in the correction rule are identified for any rotorcraft having the same structure as the test rotorcraft and having a tail fin airspeed sensor installed on board under the same conditions.

On the basis of applying said functions, the measurements of the speed of the air stream as measured by the tail fin airspeed sensor can be corrected by correcting firstly the orientations and secondly the individual amplitude values of both the longitudinal and the lateral components of the speed of the air stream as measured by the tail fin airspeed sensor. The disturbances to the measurements supplied by the tail fin airspeed sensor as generated by the flow of air along the tail fin can be taken into account by filtering the data supplied by the tail fin airspeed sensor.

Thus, and in a preferred implementation, said correction of the measurements supplied by the tail fin airspeed sensor is performed by applying at least one correction rule individually correcting at least the amplitude values and the orientations relative to the axes in which the rotorcraft generally extends of the vector components of the speed of the air stream measured by the tail fin airspeed sensor.

Preferably, said correction of the measurements supplied by the tail fin airspeed sensor further comprises data filtering applied to the data coming from the measurements supplied by the tail fin airspeed sensor, either before or after the correction applied to the measurements supplied by the tail fin airspeed sensor.

More particularly, the measurements supplied by the tail fin airspeed sensor are corrected in application at least of the following specific manners, which are preferably applied in succession.

Firstly, a phase correction is applied, correcting the individual angular orientations of each of the vector components of the speed of the air stream measured by the tail fin airspeed sensor relative to the longitudinal and transverse axes of the rotorcraft.

Said phase correction may potentially be applied while taking account at least of a predefined angle correction value. As an indication, it has been found in test flight that said phase correction may potentially lie in the range 5° to 15°, depending on the structure of the rotorcraft and depending on the manner in which the tail fin airspeed sensor is installed at the top of the tail fin. Said phase correction serves in particular to correct the effects produced on the measurements supplied by the tail fin airspeed sensor by the gyration of the air stream generated by the wash from the main rotor.

Secondly, an amplitude correction is applied individually correcting the amplitudes of each of the vector components of the speed of the air stream measured by the tail fin airspeed sensor.

Said amplitude correction serves in particular to correct the effects that result from the constriction of the air stream generated by the wash from the main rotor and takes account in particular of a correction parameter relating to the mechanical power consumed by the main rotor.

Applying the correction parameter relating to the mechanical power consumed by the main rotor serves more particularly to correct the value of the longitudinal component of the speed of the air stream measured by the tail fin airspeed sensor, as performed more particularly by constricting the air stream generated by the wash from the main rotor.

Thirdly, a lowpass filter is used to apply data filtering to the data coming from the measurements supplied by the tail fin airspeed sensor, either as supplied directly by the tail fin airspeed sensor or after the data supplied by the tail fin airspeed sensor has been corrected by applying said correction rule.

Said data filtering serves to eliminate data that has lost pertinence as a result of being affected by the flow of air along the tail fin being disturbed by the air stream generated by the wash from the main rotor and that has characteristics that depend in particular on the aerodynamic shape of the tail fin. Naturally, the characteristics of said lowpass filter are identified during said test flight.

In an advantageous implementation making it easy to take account of the effects produced by the rotation of the main rotor on the characteristics of the speed of the air stream measured by the tail fin airspeed sensor, the correction rule generally incorporates parameters for correcting the measurements supplied by the tail fin airspeed sensor and having values that are identified by calibrating the correction rule in test flight.

Such calibration of the correction rule in test flight is typically performed on board a test rotorcraft of given structure fitted with test apparatus, such as a test airspeed sensor matching the tail fin airspeed sensor in the context of the present invention. As a result, the correction rule may be applied to the measurements supplied by a standard apparatus having the same structure as the test apparatus and installed on board any rotorcraft of structure similar to that of the test rotorcraft and conforming to the conditions for installing the test apparatus on board the test rotorcraft.

The correction rule is preferably made up of functions, some of which are affine functions, the functions being applied in succession to correct the measurements supplied by the tail fin airspeed sensor.

At least one of said affine functions includes in particular a correction parameter taking account of a correction criterion relating to the mechanical power consumption of the main rotor. Said correction criterion is taken into account in particular by taking account of a correction parameter that may relate equally well to the current collective pitch angle of the blades of the main rotor, or else, in particular for a given speed of rotation of the main rotor, to the resistive torque opposed by the main rotor against being driven in rotation by a power plant forming part of the rotorcraft.

In accordance with particular implementation features of a method in accordance with the invention, the measurements supplied by the tail fin airspeed sensor are corrected in at least one of the following manners, which are preferably applied in succession:

applying first calculation functions calculating an airspeed of the rotorcraft, referred to as a "first" corrected airspeed. Said first functions individually identify a longitudinal component and a lateral component of the first corrected airspeed in the following manners:

$$V_{C_1}X = V_M * \cos(V_A + A_1)$$

$$V_{C_1}Y = V_M * \sin(V_A + A_2)$$

in which first calculation functions, $V_{C_1}X$ and $V_{C_1}Y$ are the respective values of the longitudinal component and of the lateral component of the first corrected airspeed, $V_M$ is the amplitude of the speed of the air stream measured by the tail fin airspeed sensor, $V_A$ is the orientation direction of the airspeed measured by the tail fin airspeed sensor, and $A_1$ and $A_2$ are predefined angle correction constants for the vector components of the speed of the air stream measured by the tail fin airspeed sensor.

The respective values of said constants $A_1$ and $A_2$ are identified by a calibration operation in test flight for the first calculation functions, and they may potentially be different or identical. By way of indication, the respective values of said constants $A_1$ and $A_2$ vary individually over the range 5° to 15° depending on the structure of the rotorcraft and depending on the ways in which the tail fin airspeed sensor is installed at the top of the tail fin.

applying affine second calculation functions calculating an airspeed of the rotorcraft, referred to as the second corrected airspeed. Said second calculation functions identify the amplitude values respectively of the longitudinal component and of the lateral component of the first corrected airspeed in the following manners:

$$V_{C_2}X = K1 * V_{C_1}X + K2 * A_{PC} + N1$$

$$V_{C_2}Y = K3 * V_{C_1}Y + N2$$

in which second calculation functions, $V_{C_2}X$ and $V_{C_2}Y$ are the respective values of the longitudinal component and of the lateral component of the second corrected airspeed, K1, K2, and K3 are constants having respective values identified by a calibration operation in test flight for the second calculation functions, $A_{PC}$ is the current collective pitch angle of the blades of the main rotor, and N1 and N2 are predefined summing values depending on the looked-for pertinence of the measurement of the true airspeed of the rotorcraft.

By way of indication, the values of N1 and N2 are preferably selected to be 1 kt, N2 being a positive value or a negative value depending on the direction of rotation of the main rotor.

using lowpass filtering to apply data filtering to the individual values of the longitudinal component and of the lateral component of the second corrected airspeed.

By way of indication, depending on the aerodynamic shape of the tail fin and depending on the way in which the tail fin airspeed sensor is installed on board the rotorcraft, the filtering of the values of the longitudinal component and of the lateral component of the second corrected airspeed may be performed in particular by means of lowpass filters operated at a frequency lying in the range 0.15 hertz (Hz) to 0.8 Hz.

For the rotorcraft hovering or flying at low speeds, the true airspeed of the rotorcraft as displayed on the screen is preferably the airspeed calculated after applying said data filtering.

In a preferred implementation of the invention, the measurements supplied by the tail fin airspeed sensor are corrected by taking account of a plurality of said speed thresholds comprising at least:

a first airspeed threshold associated with the rotorcraft flying at low speeds. Under such circumstances, a first mode of correcting the measurements supplied by the tail fin airspeed sensor is applied when the rotorcraft is flying at an airspeed lower than or equal to the first airspeed threshold; and a second airspeed threshold associated with the rotorcraft flying at transitional airspeeds between low airspeeds and high airspeeds of the rotorcraft. Under such circumstances, a second mode of correcting the measurements supplied by the tail fin airspeed sensor is applied when the rotorcraft is flying at an airspeed higher than the first airspeed threshold and lower than or equal to said second airspeed threshold.

Said second mode of correcting preferably comprises an additional operation of correcting the measurements supplied by the tail fin airspeed sensor by using affine third calculation functions. The affine calculation functions take account in particular of a correction parameter relating to additional measurements supplied by an auxiliary airspeed sensor installed on board the rotorcraft at a location that is as well separated as possible from the air stream produced by the wash of the main rotor, in particular such as at the nose of the rotorcraft, in conventional manner.

In a preferred implementation, said third calculation functions individually identify a longitudinal component and a lateral component of a third corrected airspeed in the following manners:

$$V_{C3}X = K4 \cdot V_{C2}X + (1-K5) \cdot VX$$

$$V_{C3}Y = K6 \cdot V_{C2}X + (1-K7) \cdot VY$$

in which third calculation functions, $V_{C3}X$ and $V_{C3}Y$ are the respective values of the longitudinal component and of the lateral component of the third corrected airspeed, K4, K5, K6, and K7 are constants having respective values that are identified by a calibration operation in test flight for the third calculation functions, and VX and VY are the respective values of the longitudinal component and of the lateral component of the speed of the air stream measured by the auxiliary airspeed sensor.

When the rotorcraft is flying at transitional airspeeds, the true airspeed of the rotorcraft as displayed by the screen is the third corrected airspeed corrected by a data filter applied in particular to the values of the longitudinal component and of the lateral component of the third corrected airspeed.

When the rotorcraft is flying at high speed at an airspeed higher than the second airspeed threshold, the measurements supplied by the auxiliary airspeed sensor are used to display the true airspeed of the rotorcraft.

The present invention also provides a rotorcraft having an airspeed indicator installation for performing a method as described above.

The airspeed indicator installation of the rotorcraft conventionally comprises at least one omnidirectional airspeed sensor, calculation means for deducing the true airspeed of the rotorcraft by making use of the measurements supplied by said at least one omnidirectional airspeed sensor, and a display screen for displaying the true airspeed of the rotorcraft as deduced by the calculation means.

According to the present invention, the rotorcraft is mainly recognizable in that at least one omnidirectional airspeed sensor, referred to as the "tail fin airspeed sensor", is installed at the top of a tail fin of the rotorcraft, in particular situated at the end of a tail boom of the rotorcraft.

The calculation means comprise comparator means for comparing the airspeed of the rotorcraft, possibly as supplied by the tail fin airspeed sensor, or else, where appropriate, as supplied by the auxiliary airspeed sensor, with at least one predefined airspeed threshold.

The calculation means incorporate a correction rule suitable for correcting the measurements supplied by the tail fin airspeed sensor as a function of effects produced by the rotation of at least a main rotor of the rotorcraft on the speed characteristics of the air stream measured by the tail fin airspeed sensor.

Said calculation means incorporate in particular said correction rule, preferably in the form of an algorithm structured as functions at least some of which are affine functions, suitable for correcting the measurements supplied by the tail fin airspeed sensor as a function of the effects produced by rotation of at least a main rotor of the rotorcraft on the characteristics of the speed of the air stream measured by the tail fin airspeed sensor, and more particularly as a function of the power consumed by the main rotor.

Said calculation rule is advantageously calibrated in test flight on board a test rotorcraft having the same structure as the rotorcraft whose true airspeed is to be identified and displayed.

In a preferred embodiment of the rotorcraft, the tail fin airspeed sensor is more particularly installed at the top of a tail fin of the rotorcraft extending upwards from a fairing surrounding a tail rotor of the rotorcraft in the general plane of the rotor disk of said tail rotor. Such a fairing contributes to protecting the tail fin airspeed sensor, in particular from a stream of air generated by the wash from the main rotor.

The tail fin airspeed sensor is preferably provided at its base with a shield for protecting it from the air stream flowing along the tail fin. Such a protective shield may for example be arranged as a plate extending substantially in the generally horizontal plane of the rotorcraft.

The rotorcraft is preferably provided with an auxiliary airspeed sensor providing the calculation means with an additional measurement of the true airspeed of the rotorcraft together with the measurements supplied by the tail fin airspeed sensor.

BRIEF DESCRIPTION OF THE SEVERAL VIEWS OF THE DRAWINGS

An implementation of the present invention is described below with reference to the figures of the sole accompanying sheet, in which.

DETAILED DESCRIPTION OF THE SEVERAL VIEWS OF THE DRAWINGS

Common members shown in the various figures are identified in the description of each of those figures while using the same reference numbers and/or letters, without that implying that each of them is shown individually in each of the figures.

Figures 1, 2:
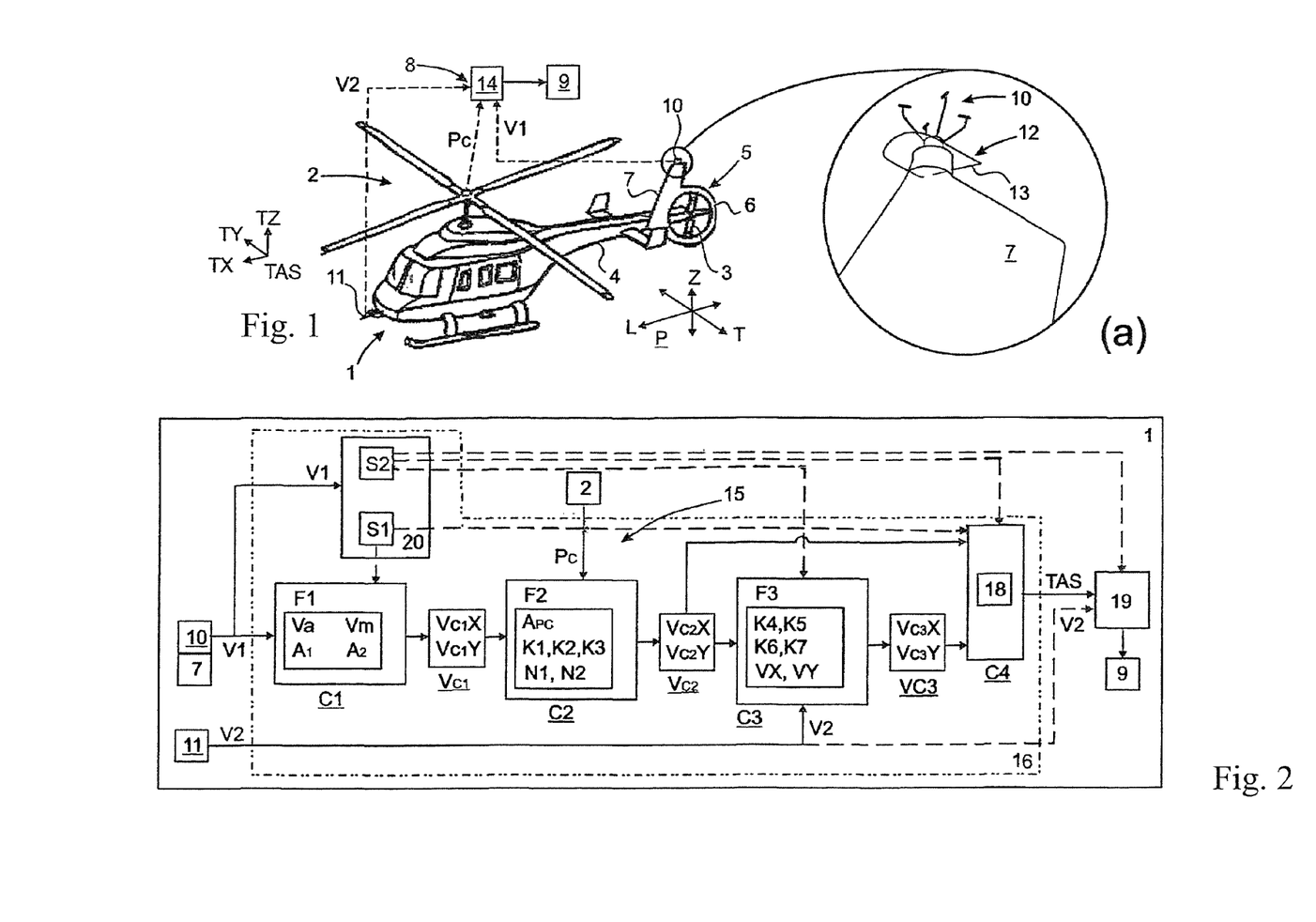
FIG. 1 is a perspective view of a rotorcraft in a preferred embodiment of the present invention.
FIG. 2 is a diagram showing the method implemented by an airspeed indicator installation fitted to the rotorcraft shown in FIG. 1 in an embodiment of the present invention.

In FIG. 1, a rotorcraft 1 is conventionally provided with a main rotor 2 serving essentially to provide the rotorcraft 1 with lift. In the example shown, the rotorcraft 1 is more particularly a helicopter, the rotor 2 also providing the rotorcraft 1 with propulsion along its various travel axes L, T, and Z, and also providing the rotorcraft 1 with guidance in pitching and in roll.

The rotorcraft 1 also has an auxiliary rotor 3 installed at the end of a tail boom 4 of the rotorcraft 1. The auxiliary rotor 3 serves to stabilize and guide the rotorcraft 1 in yaw. The end of the tail boom 4 has a ducted tail rotor 5 named "Fenestron (registered trademark)" tail rotor 5 comprising a fairing 6 surrounding the rotary wing of the auxiliary rotor 3. The tail boom 4 has a tail fin 7 projecting up from the fairing 6, the top of the tail fin 7 being above the rotor disk of the auxiliary rotor 3, and preferably also being higher than the rotor disk of the main rotor 3.

The rotorcraft 1 has an airspeed indicator installation 8 making it possible to calculate the true airspeed TAS of the rotorcraft 1 while in flight. A display screen 9 serves to provide the pilot of the rotorcraft 1 with information relating to the TAS of the rotorcraft 1, which is calculated iteratively at a given repetition rate by the airspeed indicator installation 8.

For this purpose, the airspeed indicator installation 8 comprises a pair of omnidirectional airspeed sensors 10, 11 providing measurements V1 and V2 relating to the characteristics of the air streams in the immediate vicinity of the respective sensors 10 and 11, said measurements V1 and V2 being delivered to an on-board computer 14 that deduces the TAS of the rotorcraft 1 from said measurements V1 and V2.

A first airspeed sensor is a tail fin airspeed sensor 10 installed at the top of the tail fin 7. The fairing 6 that preferably surrounds the rotary wing of the tail rotor 3 advantageously protects the tail fin airspeed sensor 10 at least in part from the air stream generated by the wash of the tail rotor 3.

Furthermore, and with reference to a detail (a) in FIG. 1, the tail fin airspeed sensor 10 is protected from the air stream flowing along the tail fin 7 by means of a shield 12 interposed between the top of the tail fin 7 and the tail fin airspeed sensor 10.

In the embodiment shown, the shield 12 is formed by a plate 13 having its general plane lying in a plane that is substantially parallel to the horizontal plane P in which the rotorcraft 1 extends. Said horizontal plane P in which the rotorcraft 1 extends is conventionally defined by the axis L extending longitudinally from front to rear of the rotorcraft 1 and by the axis T extending transversely relative to the rotorcraft 1, the rotorcraft being considered while on the ground.

A second airspeed sensor is an auxiliary airspeed sensor 11 installed on the rotorcraft at a location that is protected as well as possible from the wash generated by the main rotor 2, such as conventionally at the nose of the rotorcraft 1, as shown, or indeed at the top of a pole above and extending along the rotary drive axis of the main rotor 2 in an analogous variant that is not shown.

Naturally, and as is conventional in aviation, the TAS of the rotorcraft 1 is identified by vector components, including at least a longitudinal component TX and at least a lateral component TY, and possibly also a vertical component TZ, which components extend generally along the longitudinal axis L, the transverse axis T, and the vertical axis Z relative to the rotorcraft.

In FIG. 2, the TAS of the rotorcraft 1 while hovering and/or while flying at low speed is determined and then displayed by correcting the measurements V1 supplied by the tail fin airspeed sensor 10. Said correction is made by applying a correction rule 15 using the calculation means 16 of the airspeed indicator installation 8 as implemented by the computer 14.

The correction rule 15 has functions F1, F2, and F3, of which the functions F2 and F3 are affine functions, for correcting the measurements V1 supplied by the tail fin airspeed sensor 10 by taking account of the effects produced by the air stream generated by the wash of the main rotor 2 on the measurements V1 supplied by the tail fin airspeed sensor 10. The correction rule 15 incorporates a plurality of correction parameters of values that are determined beforehand during an operation of calibrating the calculation rule 15 in test flight.

Prior to correcting the measurements V1 supplied by the tail fin airspeed sensor 10, the airspeed of the rotorcraft, preferably as supplied by the tail fin airspeed sensor 10, is compared with predefined speed thresholds S1 and S2 by comparator means 20 that may be incorporated in the calculation means 16. These provisions make it possible to identify when the rotorcraft 1 is moving at speeds lower than low speeds or at transitional speeds lying between low speeds and the high speeds of the rotorcraft 1 when in cruising flight.

The values of said speed thresholds S1 and S2 typically identify the rotorcraft 1 as flying at low speeds for a first airspeed threshold S1, and the rotorcraft 1 as flying at transitional speeds for a second airspeed threshold S2.

When the rotorcraft 1 is flying at high speeds, higher than the airspeed threshold S2, the true airspeed of the rotorcraft as displayed by the screen 9 corresponds to the measurements V1 and/or V2 supplied by at least one of the airspeed sensors 10, 11, but preferably by the auxiliary airspeed sensor 11, which is designed to operate over a range of high airspeeds.

When the rotorcraft 1 is flying at high speeds, it is considered that the influence of the wash from the main rotor 2 on the pertinence of measurements V2 supplied by the auxiliary airspeed sensor 11 is negligible in identifying the airspeed of the rotorcraft 1.

When the rotorcraft 1 is flying at low speeds or at transitional speeds, a phase correction C1 modifying the respective orientations of the vector components of the air stream speed as measured by the tail fin airspeed sensor is performed by applying first functions F1.

Said phase correction C1 seeks in particular to correct the orientations of the vector components of the speed of the air stream as measured by the tail fin airspeed sensor 10 relative to the reference frame of the rotorcraft as defined by the axes X, Y, and Z along which it extends.

The first functions F1 are executed by using the amplitude Vm and the orientation Va of the speed of the current air stream as measured by the tail fin airspeed sensor 10, together with constants A1 and A2 of values that are calibrated during said test flight. The first correction C1 identifies a longitudinal component $V_{C1}X$ and a transverse component $V_{C1}Y$ of a first corrected airspeed $V_{C1}$.

Thereafter, an amplitude correction C2 corrects the respective values of the amplitudes of the vector components $V_{C1}X$ and $V_{C1}Y$ for the first corrected airspeed $V_{C1}$ by applying second functions F2.

The second functions F2 are executed by taking account in particular of the power consumption Pc of the main rotor 2. By way of example, for this purpose, account is taken more particularly of the current value of the collective pitch angle $A_{PC}$ of the main rotor 2.

The second functions F2 incorporate constants K1, K2, and K3 of values that are calibrated during said test flight, together with predefined summing values N1 and N2. The amplitude correction C2 identifies a longitudinal component $V_{C2}X$ and a transverse component $V_{C2}Y$ of a second corrected airspeed $V_{C2}$ after correcting the amplitudes of the components of the first corrected airspeed $V_{C1}$.

Specifically, for the rotorcraft 1 flying at a transitional speed, an additional correction C3 is performed in order to correct the second corrected airspeed $V_{C2}$. The additional correction C3 is performed by applying third functions F3 that take account of the additional measurements V2 supplied by the auxiliary airspeed sensor 11.

The third functions F3 incorporate constants K4, K5, K6, and K7 of values that are calibrated during said test flight and they take account of the values of the longitudinal components VX and of the lateral components VY of the speed of the air stream measured by the auxiliary airspeed sensor 11 that supplies said additional measurements V2.

The third correction C3 identifies the respective values of a longitudinal component $V_{C3}X$ and of a transverse component $V_{C3}Y$ of a third corrected airspeed $V_{C3}$ after adjusting the second corrected airspeed $V_{C2}$ as a function of the additional measurements V2 supplied by the auxiliary airspeed sensor 11.

In order to eliminate data noise picked up by the tail fin airspeed sensor 10 resulting from the flow of air along the tail fin 7, a fourth correction operation by data filtering C4 is performed by means of lowpass filters 18. Said data filtering C4 is applied in particular after executing the correction rule 15 as shown, or possibly by filtering the measurements V1 as supplied directly by the tail fin airspeed sensor 10 in a variant that is not shown.

The TAS of the rotorcraft 1 is then displayed on the screen 9 during a display operation 19. During hovering flight and/or when the rotorcraft 1 is flying at low speeds, the second corrected airspeed $V_{C2}$ is displayed, where appropriate after data filtering by the lowpass filters 18.

When the rotorcraft is flying at transitional speeds, the third corrected airspeed $V_{C3}$ is displayed, where appropriate after data filtering by the lowpass filters 18.

When the rotorcraft 1 is flying at high speeds, the measurements V2 supplied by the auxiliary airspeed sensor 11 may be used in order to identify and display on the screen 9 the TAS of the rotorcraft 1.

What is claimed is:

1. A method of calculating and displaying the true airspeed of a rotorcraft having at least one tail fin and at least one main rotor providing the rotorcraft essentially with its main lift, and a tail rotor providing the rotorcraft at least with guidance in yaw, the method comprising an operation of calculating the true airspeed of the rotorcraft from measurements supplied by at least one omnidirectional airspeed sensor and a display operation of displaying on a screen the true airspeed of the rotorcraft as deduced by an operation of calculating, wherein the operation of calculating the true airspeed of the rotorcraft is performed on the basis of measurements supplied by at least one omnidirectional airspeed sensor installed at the top of the tail fin, the at least one omnidirectional airspeed sensor thus being referred to as the "tail fin airspeed sensor".

2. A method according to claim 1, wherein the true airspeed of the rotorcraft flying at speeds lower than or equal to at least one predefined airspeed threshold of the rotorcraft is calculated by correcting the measurements supplied by the tail fin airspeed sensor as a function of effects produced by the stream of air generated by the rotation of the main rotor on the characteristics of the speed of the air stream measured by the tail fin airspeed sensor.

3. A method according to claim 2, wherein the correction of the measurements supplied by the tail fin airspeed sensor is performed by applying at least one correction rule correcting at least the amplitude values and the orientations relative to the axes in which the rotorcraft generally extends of the vector components of the speed of the air stream measured by the tail fin airspeed sensor.

4. A method according to claim 3, wherein the correction of the measurements supplied by the tail fin airspeed sensor further comprises data filtering applied to the data coming from the measurements supplied by the tail fin airspeed sensor, either before or after the correction applied to the measurements supplied by the tail fin airspeed sensor.

5. A method according to claim 3, wherein the correction of the measurements supplied by the tail fin airspeed sensor is performed more specifically in at least of the following manners:
   applying a phase correction correcting the individual angular orientation of each of the vector components of the speed of the air stream measured by the tail fin airspeed sensor relative to the longitudinally and transversely extending axes of the rotorcraft;
   applying an amplitude correction individually correcting the amplitudes of each of the vector components of the speed of the air stream measured by the tail fin airspeed sensor; and
   using a lowpass filter to apply data filtering to the data coming from the measurements supplied by the tail fin airspeed sensor.

6. A method according to claim 3, wherein the correction rule incorporates parameters for correcting the measurements supplied by the tail fin airspeed sensor and having values that are identified by calibrating the correction rule in test flight.

7. A method according to claim 3, wherein the correction rule is made up of functions, some of which are affine functions, the functions being applied in succession to correct the measurements supplied by the tail fin airspeed sensor.

8. A method according to claim 7, wherein at least one of the affine functions includes a correction parameter taking account of a correction criterion relating to the mechanical power consumption of the main rotor.

9. A method according to claim 8, wherein the correction criterion is taken into account by taking account of the current collective pitch angle ($A_{PC}$) of the blades of the main rotor.

10. A method according to claim 8, wherein the correction criterion is taken into account by taking account of the resistive torque opposed by the main rotor against being driven in rotation by a power plant forming part of the rotorcraft.

11. A method according to claim 1, wherein the measurements supplied by the tail fin airspeed sensor are corrected by performing the following successive operations:
applying first calculation functions calculating an airspeed of the rotorcraft, referred to as a "first" corrected airspeed ($V_{C1}$), the first functions individually identifying a longitudinal component ($V_{C1}X$) and a lateral component ($V_{C1}Y$) of the first corrected airspeed ($V_{C1}$) in the following manners:

$$V_{C1}X = V_M * \cos(V_A + A_1)$$

$$V_{C1}Y = V_M * \sin(V_A + A_2)$$

in which first calculation functions, $V_{C1}X$ and $V_{C1}Y$ are the respective values of the longitudinal component and of the lateral component of the first corrected airspeed ($V_{C1}$), $V_M$ is the amplitude of the speed of the air stream measured by the tail fin airspeed sensor, $V_A$ is the orientation direction of the airspeed measured by the tail fin airspeed sensor, and $A_1$ and $A_2$ are predefined angle correction constants for the vector components of the speed of the air stream measured by the tail fin airspeed sensor, the respective values of the constants $A_1$ and $A_2$ being identified by a calibration operation in test flight for the first calculation functions;
applying affine second calculation functions calculating a second corrected airspeed ($V_{C2}$), the second calculation functions identifying the amplitude values respectively of the longitudinal component ($V_{C2}X$) and of the lateral component ($V_{C2}Y$) of the first corrected airspeed ($V_{C1}$) in the following manners:

$$V_{C2}X = K1 * V_{C1}X + K2 * A_{PC} + N1$$

$$V_{C2}Y = K3 * V_{C1}Y + N2$$

in which second calculation functions, $V_{C2}X$ and $V_{C2}Y$ are the respective values of the longitudinal component and of the lateral component of the second corrected airspeed ($V_{C2}$), K1, K2, and K3 are constants having respective values identified by a calibration operation in test flight for the second calculation functions, $A_{PC}$ is the current collective pitch angle of the blades of the main rotor, and N1 and N2 are predefined summing values depending on the looked-for pertinence of the measurement of the true airspeed of the rotorcraft; and
using lowpass filtering to apply data filtering to the individual values of the longitudinal component ($V_{C2}X$) and of the lateral component ($V_{C2}Y$) of the second corrected airspeed ($V_{C2}$).

12. A method according to claim 4, wherein in hovering flight and in low speed flight of the rotorcraft, the true airspeed of the rotorcraft as displayed on the screen is the airspeed calculated after applying the data filtering.

13. A method according to claim 1, wherein the measurements supplied by the tail fin airspeed sensor are corrected by taking account of a plurality of the airspeed thresholds comprising at least:
a first airspeed threshold associated with the rotorcraft flying at low speeds, with a first mode of correcting the measurements supplied by the tail fin airspeed sensor being applied when the rotorcraft is flying at an airspeed lower than or equal to the first airspeed threshold; and
a second airspeed threshold associated with the rotorcraft flying at transitional airspeeds between low airspeeds and high airspeeds of the rotorcraft, a second mode of correcting the measurements supplied by the tail fin airspeed sensor being applied when the rotorcraft is flying at an airspeed higher than the first airspeed threshold and lower than or equal to the second airspeed threshold.

14. A method according to claim 13, wherein the second mode of correcting comprises an additional operation of correcting the measurements supplied by the tail fin airspeed sensor by using affine third calculation functions taking account of a correction parameter relating to additional measurements supplied by an auxiliary airspeed sensor installed on board the rotorcraft at a location that is as well separated as possible from the air stream produced by the wash of the main rotor.

15. A method according to claim 14, wherein the third calculation functions individually identify a longitudinal component ($V_{C3}X$) and a lateral component ($V_{C3}Y$) of a third corrected airspeed ($V_{C3}$) in the following manners:

$$V_{C3}X = K4 * V_{C2}X + (1-K5) * VX$$

$$V_{C3}Y = K6 * V_{C2}X + (1-K7) * VY$$

in which third calculation functions, $V_{C3}X$ and $V_{C3}Y$ are the respective values of the longitudinal component and of the lateral component of the third corrected airspeed ($V_{C3}$), K4, K5, K6, and K7 are constants having respective values that are identified by a calibration operation in test flight for the third calculation functions, and VX and VY are the respective values of the longitudinal component and of the lateral component of the speed of the air stream measured by the auxiliary airspeed sensor.

16. A method according to claim 15, wherein when the rotorcraft is flying at transitional airspeeds, the true airspeed of the rotorcraft as displayed by the screen is the third corrected airspeed ($V_{C3}$) corrected by a data filter applied individually to the longitudinal component ($V_{C3}X$) and to the lateral component ($V_{C3}Y$) of the third corrected airspeed ($V_{C3}$).

17. A method according to claim 13, wherein when the rotorcraft is flying at high speed at an airspeed higher than the second airspeed threshold, the measurements supplied by the auxiliary airspeed sensor are used to display the true airspeed of the rotorcraft.

18. A rotorcraft having an airspeed indicator installation for performing a method according to claim 1, the airspeed indicator installation including at least one omnidirectional airspeed sensor, calculation means for deducing the true airspeed of the rotorcraft by making use of the measurements supplied by at least one omnidirectional airspeed sensor, and a display screen for displaying the true airspeed of the rotorcraft as deduced by the calculation means, wherein the at least one omnidirectional airspeed sensor, referred to as the "tail fin airspeed sensor", is installed at the top of a tail fin of the rotorcraft.

19. A rotorcraft according to claim 18, wherein the calculation means comprise comparator means for comparing the airspeed of the rotorcraft supplied by the tail fin airspeed sensor with at least one predefined airspeed threshold, the calculation means incorporating a correction rule suitable for correcting the measurements supplied by the tail fin airspeed sensor as a function of effects produced by the rotation of at least a main rotor of the rotorcraft on the speed characteristics of the air stream measured by the tail fin airspeed sensor.

20. A rotorcraft according to claim 18, wherein the tail fin airspeed sensor is more particularly installed at the top of a tail fin of the rotorcraft extending upwards from a fairing surrounding a tail rotor of the rotorcraft in the general plane of the rotor disk of the tail rotor.

21. A rotorcraft according to claim 18, wherein the tail fin airspeed sensor is provided at its base with a shield for protecting it from the air stream flowing along the tail fin.

22. A rotorcraft according to claim 18, wherein the rotorcraft has an auxiliary airspeed sensor providing the calculation means with an additional measurement of the true airspeed of the rotorcraft together with the measurements supplied by the tail fin airspeed sensor.

* * * * *